Aug. 21, 1951     J. M. MOCHEL     2,564,707
ELECTRICALLY CONDUCTING COATING ON GLASS
AND OTHER CERAMIC BODIES
Filed Sept. 3, 1947     2 Sheets-Sheet 1
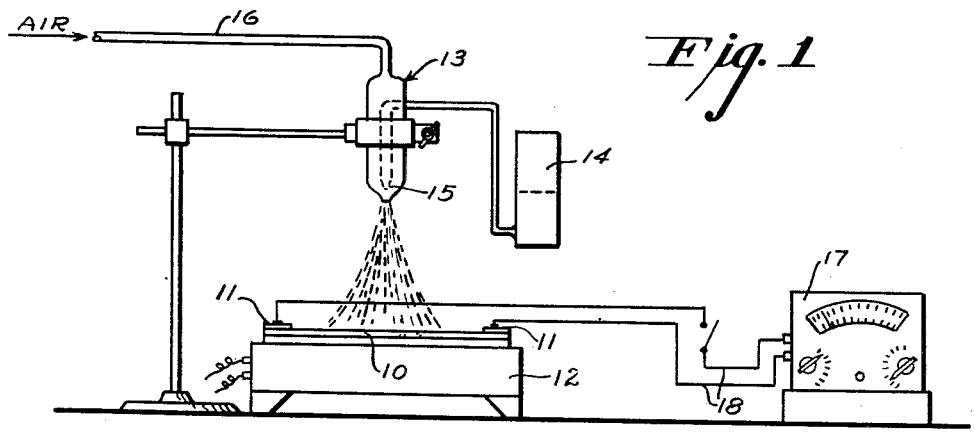
Fig. 1
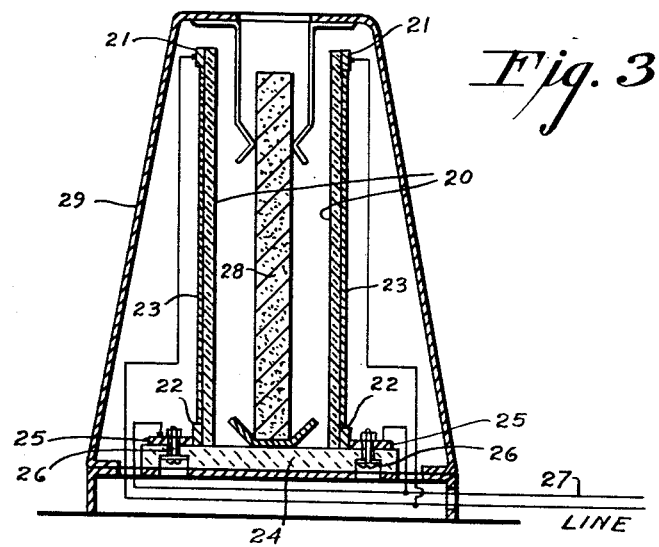
Fig. 3
Inventor
JOHN M. MOCHEL
By 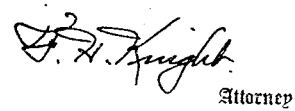
Attorney Patented Aug. 21, 1951

2,564,707

UNITED STATES PATENT OFFICE 2,564,707

ELECTRICALLY CONDUCTING COATINGS ON GLASS AND OTHER CERAMIC BODIES

John M. Mochel, Corning, N. Y., assignor to Corning Glass Works, Corning, N. Y., a corporation of New York Application September 3, 1947, Serial No. 771,859

1 Claim. (Cl. 117—54)

This application is a continuation in part of my pending application Serial Number 666,555, filed May 2, 1946, and relates to glass articles and other ceramic bodies having electrically conducting oxide coatings of the kind known generally as iridized coatings. When glass or other vitreous ceramic body is heated and contacted with certain metal salts either in the form of fumes or atomized solutions thereof, a strongly adherent layer of an oxide of the metal is formed on its surface. This process is known as iridizing because the coatings thus produced are frequently iridescent due to interference of light waves reflected from the extremely thin oxide films.

The application of iridizing to glass for the production of beautiful art ware is quite old, and for this purpose salts of tin and of iron are employed. More recently it has been found that tin iridized coatings have a sufficiently low electrical resistivity at normal temperature to permit their use on high tension electric insulators for the purpose of spreading the potential gradient on the surfaces of the insulators and thus preventing corona and radio interference, as disclosed in United States Patent 2,118,795, issued May 2, 1938, to Jesse T. Littleton.

For purposes requiring still lower electrical resistivities, the tin iridized coatings are not suitable. According to the Littleton patent, coatings produced by salts of many other metals per se are practically non-conducting. Moreover, I have found that the electrical stability of tin iridized coatings, that is, the invariability of their resistance at given temperatures after heating and cooling, is poor.

One of the chief objects of this invention is to produce glass and other non-porous ceramic articles provided with electrically conducting coatings which are permanently incorporated with the glass or ceramic surface, which have high electrical and thermal stabilities and which have sufficiently low electrical resistivities to permit the use of such articles for electric heating devices.

Another object is to lower the electrical resistivity of tin iridized coatings.

Another object is to produce conducting iridized coatings which are electrically stable or which have substantially constant electrical resistances at given temperatures.

Another object is to produce conducting iridized coatings which have zero or positive temperature coefficients of resistance.

Another object is to control the electrical resistivity of tin iridized coatings.

Another object is to provide transparent electric resistance elements for use in electric heating devices such as ovens, broilers, toasters, flat irons, grills, space heaters, and the like.

Another object is to provide glass bodies having iridized coatings of predetermined electrical resistance.

Another object is to provide improved high resistances, rheostats, grid leaks, and the like.

Another object is to provide an iridized film comprising an oxide of tin and an oxide of antimony.

Another object is to provide transparent electrically conducting iridized coatings which contain an oxide of tin and an oxide of antimony.

Another object is to provide a conducting iridized coating which contains an oxide of indium and an oxide of tin.

Another object is to provide a conducting iridized coating which contains an oxide of cadmium and an oxide of indium.

To these and other ends the invention comprises ceramic articles provided with electrically conducted iridized coatings, to be hereinafter more fully described and illustrated in the accompanying drawings in which:

Fig. 1 is an elevation of an apparatus for iridizing glass sheets in accordance with the invention.

Fig. 3 is a vertical sectional view of an electrically-heated device for toasting bread made in accordance with the invention.

Figure 2:
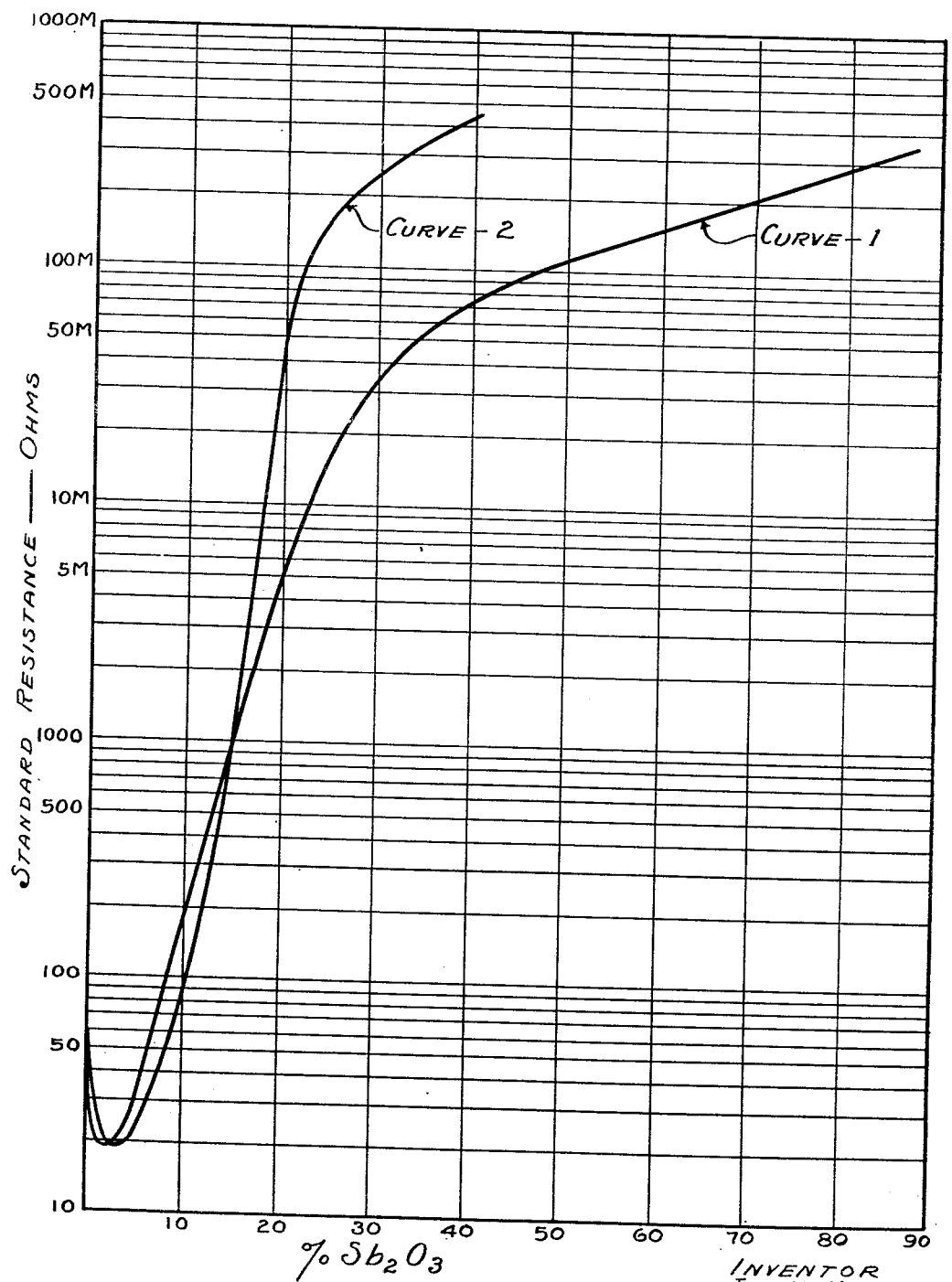
Fig. 2 is a graph illustrating the change in electrical resistance of tin-antimony iridized coatings with variation of the antimony content.

I have found that oxide coatings having new and useful characteristics can be produced by iridization, using certain mixtures of metal salts comprising salts of cadmium, indium, tin, and antimony. These metals have atomic weights ranging from about 112 to about 122 and are numbered from 48 to 51 respectively in the periodic system of elements. For the present purpose they are combined thus: salts of tin plus salts of antimony, or salts of tin plus salts of indium, or salts of cadmium plus salts of indium. Combinations consisting of salts of the following metals, Sn and Cd, Cd and Sb, Sb and In, produce coatings having very high resistances. Salts of cadmium alone and of indium alone produce coatings of relatively low resistances which respectively form the subject matter of pending applications, Serial No. 771,861, filed September 3, 1947, now abandoned, and Serial No. 771,860, also filed September 3, 1947. Salts of other metals may be used in small amounts not exceeding about 20% in combination with mixtures of salts of tin plus salts of antimony, or mixtures of salts of tin plus salts of indium.

The oxide films resulting from the use of such mixtures of salts generally have lower electrical resistivities than prior iridized coatings, the minimum electrical resistivity of the films produced by mixtures of tin and antimony salts, for example, being only about one-twentieth of that of a similar film produced by a salt of tin alone. Under some circumstances and for some purposes the resistivities of the new coatings may be higher. An outstanding feature of the new films containing oxides of tin and antimony is their improved electrical stability, as will later appear.

The electrical properties of the new oxide films are influenced by various factors including thickness of the films, the presence therein of minor amounts of modifying metallic oxides, the temperature at which the films are produced and the relative expansion coefficients of the films and the glass or ceramic body upon which they are deposited, as will hereinafter be more fully explained.

The thickness of the iridized film may be gauged by the apparent color of the film caused by interference of light reflected therefrom. As the thickness of the film increases, its apparent color changes and the order or succession of the colors with increasing thickness is analogous to that of the well known Newton rings described in "A Treatise on Light," by R. A. Houstoun, Longmans Green & Co., Ltd., (1938), page 147, as follows:

1st order—white, yellow, red
2nd order—violet, blue, green, yellow, red
3rd order—purple, blue, green, yellow, red
4th order—green, red
5th order—greenish-blue, red
6th order—greenish-blue, pale red
7th order—greenish-blue, reddish-white Obviously, a film of uniform thickness will appear to be of one color only. A slight non-uniformity in film thickness at its edge will produce sufficient color sequence to identify the order of thickness of the main portion of the film. As a further aid, a long strip of glass may be iridized by directing the spray at one end thereof whereby the various orders of colors will be spread longitudinally of the strip and will serve as a convenient comparison. Since red marks the end of each order, this color is preferably employed as the distinguishing mark of the successive orders and, for present purposes, is assigned a wave length of 6200 Angstroms. Calculation shows that the approximate film thickness in Angstroms for the various orders of red is as follows:

| Order | Angstroms |
|---|---|
| 1 | 775 |
| 2 | 2,320 |
| 3 | 3,870 |
| 4 | 5,420 |
| 5 | 6,970 |

The extreme thinness of the present films necessitates an explanation of the manner of expression of their electrical resistance herein. The common unit of electrical resistivity of any material is the "ohm cm." which is the resistance in ohms between two opposite faces of a cube of the material, each dimension of which is 1 cm. For a square film of material the electrical resistivity therefore becomes the resistance in ohms multiplied by the thickness of the film in centimeters. For convenience the resistance in ohms of a square film of third order red is herein employed as the unit of specific resistance, and in order to avoid confusion it is designated "standard resistance."

The iridized oxide films of this invention may be formed advantageously upon the surface of a glass article, such as a glass sheet. They are preferably produced by heating the glass uniformly to an elevated temperature which may be about 500° C. or above, and atomizing a solution containing the desired metal salts as a fine mist upon the heated glass for a length of time sufficient to produce an iridized film of the desired thickness and electrical resistance.

By way of example, the production of coatings comprising the oxides of tin and antimony will be described, it being understood that the procedure is substantially the same for each of the various mixtures of metal salts recited above. Although liquid antimony pentachloride ($SbCl_5$) may be dissolved directly in liquid anhydrous stannic tetrachloride ($SnCl_4$) and the mixture may be vaporized by a stream of air passed through it, it is preferable to atomize a water solution of tin and antimony chlorides containing free hydrochloric acid because better control of film thickness can thereby be obtained and other metal salts can thereby be introduced into the solution as modifying agents, as will be shown. For convenience, the proportions of the base solution may comprise 100 grams of stannic tetrachloride pentahydrate ($SnCl_4 \cdot 5H_2O$), 50 cc. of water and 10 cc. of concentrated aqueous hydrochloric acid, to which may be added the desired amount of antimony trichloride and, if desired, other metal salts. The atomized solution is preferably directed perpendicularly against the surface to be coated for a time, usually 10 to 20 seconds, which will depend upon the rate of atomization, the concentration of the solution, and the desired thickness of the film, but which may readily be determined by trial. The thickness of the film depends upon the desired electrical resistance thereof. For thicknesses up to about 5500 Angstroms, the electrical resistance of a film consisting of a conducting mixture of oxides of tin and antimony decreases linearly as the thickness increases. If desired, the electrical resistance may be measured with an ohmmeter during iridizing. For this purpose and for subsequent use in the application of electric current to the film, permanent electrical contacts therewith may be provided on the glass plate before iridizing takes place. This may be accomplished by metallizing two opposite edges of the glass plate, as by the application thereto of a platinizing solution which is fired on in the usual manner to provide adherent bands or stripes of metallic platinum on the glass.

In the drawings, Fig. 1 illustrates one form of apparatus for carrying out the above-described process. A glass plate 10, provided with platinized stripes 11 (shown on an exaggerated scale) on two opposite edges, is about three inches square between the stripes 11. It is heated uniformly on an electric hot plate 12. At atomizer, generally designated 13 and preferably composed of glass, comprises a cup 14 for containing the solution of salts to be atomized, an atomizing nozzle 15 and a tube 16 for the introduction of compressed air to the nozzle. The atomizer is so supported that the nozzle 15 is about one foot above the glass plate. An ohmmeter 17 is provided with two contact leads 18 which may be brought into electrical contact with the stripes 11 (as shown) before atomization. As atomization proceeds and a conducting iridized film is formed on the glass, the electrical resistance which is registered by the ohmmeter decreases from an initial infinite value as the thickness of the film increases. When the electrical resistance attains a sufficiently low value, atomization is stopped by cutting off the supply of compressed air from the atomizer 13.

The effect of antimony upon the electrical resistivity of tin iridized films is demonstrated in the graph shown in Fig. 2 wherein the "standard resistance" of iridized films consisting of oxides of tin and antimony on borosilicate glass is plotted in curve 1 against the weight percentage of antimony oxide ($Sb_2O_3$) calculated on the oxide basis from the compositions of the solutions employed to produce the iridized films, and in curve 2 against the weight percentage of $Sb_2O_3$ determined by analysis of the films. Since the change in resistance is very great as compared to the the change in antimony content, the "standard resistance" is plotted on a logarithmic scale in order to reduce the size of the graph and to permit a better representation of the data. It will be noted that the "standard resistance" decreases very rapidly with very small additions of antimony oxide (.001% to .5% $Sb_2O_3$) and a minimum "standard resistance" of about 19 ohms is obtained with about 3% to 4% $Sb_2O_3$. It will also be noted that the relative percentage of antimony in the film is not always the same as the percentage of antimony in the solution used in making the film. Other factors being constant, solutions containing the equivalent of 15% $Sb_2O_3$ produce films containing about 15% $Sb_2O_3$. With solutions containing less than 15% $Sb_2O_3$ the resulting films will contain somewhat larger percentages of antimony than the respective solutions. With solutions containing more than 15% $Sb_2O_3$ the films will contain substantially smaller percentages of antimony than the respective solutions. This is demonstrated by the fact that curves 1 and 2 cross at 15% $Sb_2O_3$. Films containing less than 15% $Sb_2O_3$ are particularly useful for electric heating devices. Films containing higher percentages of antimony oxide have high resistivities and a dark blue color and are useful for various purposes, as will later appear.

An important function of the antimony oxide in the new tin-antimony iridized films is its stabilizing effect on the electrical properties of the films. The electrical resistance at room temperature of an iridized film containing tin oxide alone will change from its initial value by as much as 70% when it is heated for a time and then is allowed to cool freely. The introduction of antimony salt into the iridizing solution decreases this change to less than 2% when the antimony content of the solution on the oxide basis is about 6% $Sb_2O_3$ and the change is no more than 7% when the antimony content of the solution is 3% $Sb_2O_3$.

The electrical resistance of tin oxide-antimony oxide iridized films of constant composition decreases regularly with increasing film thicknesses up to the 4th or 5th order. For thickness beyond the 5th order, the crystal structure of the film tends to degenerate and the decrease in electrical resistance with increase in thickness becomes less marked. Increase of antimony oxide content in the film diminishes the tendency for degeneration of its crystal structure and films of high orders of thickness up to the 20th order (60,000 Angstroms) or thicker may be made. A film of the 13th order of thickness, made from a solution consisting of $SnO_2$ and about 1% $Sb_2O_3$, had an electrical resistance of 4 ohms per square.

The conducting iridized films made in accordance with this invention possess a characteristic which not only has great importance for their use in electric heating devices, but is in direct contradiction with the known characteristics of electric conductors in general. Most of the new low resistance films have positive temperature coefficients of resistance, that is, their resistances increase slightly with rise in temperature. It is well known that metallic conductors have positive temperature coefficients of resistance but that metal oxides in general have negative temperature coefficients of resistance. It is therefore surprising that the temperature coefficients of resistance of the new low resistance films should have a positive value, inasmuch as they are composed of metal oxides insofar as is known. It is the more surprising in that iridized films produced with a salt of tin alone usually have negative coefficients of resistance.

Under some circumstances, the temperature coefficient of resistance of the new iridized films may be negative. This may occur in films consisting of oxides of tin and antimony when the antimony content is high. It may also occur when other metal oxides are added as modifiers, as will be shown. Such negative temperature coefficients of resistance are so small, however, that the films are useful for the purpose of this invention.

It has also been found that, when the thermal expansion coefficient of the tin-antimony iridized film, which is about $45 \times 10^{-7}$ cm. per cm. per degree C., too greatly exceeds the thermal expansion coefficient of the glass or ceramic support upon which the film is deposited, the temperature coefficient of resistance of the film may be negative if the antimony content is low and the film is relatively thick. For example, on a high silica glass having a thermal expansion coefficient of about $8 \times 10^{-7}$ cm. per cm. per degree C., a tin-antimony iridized film of the 4th order made from a solution containing about 1% $Sb_2O_3$ has a negative temperature coefficient of resistance. The latter value will be positive if the film is thin, say of the 1st order, or if the antimony content is somewhat higher, say about 5% $Sb_2O_3$. The temperature coefficients of resistance of low resistance tin-antimony films deposited on heat resisting borosilicate glass having a thermal expansion coefficient of about $33 \times 10^{-7}$ cm. per cm. per degree C. are usually positive and such articles are particularly useful for electric heating devices. It is believed that negative temperature coefficients of resistance due to differences in expansion coefficients result from stresses in the iridized film caused by differential expansion between the film and its support when the temperature is increased. Antimony contents of about 1% to 2% or more of $Sb_2O_3$ appear to toughen the film or otherwise diminish the effect of the differential expansivities.

A positive or zero temperature coefficient of resistance is important for coatings which are to be used for the generation of heat because local overheating and destructive flashover of the coating are thereby avoided. Heretofore, only metallized coatings or thin layers of metal on glass or ceramics were suitable for this purpose. Such metallized coatings have maximum electrical resistances of only about 10 ohms per square and higher resistances are desirable. The new iridized coatings may be produced with predetermined electrical resistances ranging upward from about 10 ohms per square or less.

Another important characteristic of the electrically conducting tin-antimony iridized films made in accordance with this invention is their substantial transparency for visible light. With low antimony contents, 1% $Sb_2O_3$ or less, such films are substantially transparent and are practically colorless by transmitted light. However, as the antimony content is increased, the film acquires a blue color which becomes darker with increasing antimony and with about 15% $Sb_2O_3$ the film transmits a deep midnight blue color and has a generally low visible transmission.

For the production of transparent heating elements, such as devices for toasting bread, which are to be operated at temperatures of about 350° C., or higher, on a line voltage of 110 volts, a "standard resistance" of about 40 ohms is required and it will be evident from the foregoing discussion and Fig. 2 that third-order iridized films consisting of oxides of tin and antimony may be objectionably colored for this purpose since they would contain about 8% $Sb_2O_3$. For such purposes I have found that the electrical resistance of the iridized films may advantageously be controlled by the addition to the iridizing solution of other metal salts which will raise the resistivity of the films to the desired extent without decreasing their transmisison for visible light. Any metal, the salt of which will hydrolyze or decompose in the presence of water at elevated temperatures to precipitate the corresponding metal oxide, may be used. Such modifying salts vary somewhat in their effectiveness and for small antimony contents (1% or less $Sb_2O_3$) may cause very rapid increase in the electrical resistivity of tin-antimony iridized films for relatively small increments of the salt. As the antimony content of the iridized film is increased, the effect of the modifying salt is diminished so that larger amounts, up to about 20%, of the modifying salt can be tolerated and the control of electrical resistance thereby becomes more flexible. The salts of some metals, such as copper, iron, zinc, and manganese, also cause a decrease in the coloration normally caused by antimony. In other words, the addition of one or more of these metals produces colorless films or films possessing less color than would be the case if they were omitted. As modifiers, the salts of copper and iron used together are particularly suitable because they also lessen the effect which the temperature of iridization sometimes has on the resistance of the film.

Transparent electrically conducting oxide coatings can also be produced by iridization in the manner described above using solutions composed of mixtures of various proportions of an indium salt and a tin salt or mixtures of various proportions of a cadmium salt and an indium salt. Small amounts of other salts may be added to these solutions for modifying the electrical resistance and other physical properties of the resulting iridized films, as the following examples will illustrate.

In the following examples, which illustrate the preferred form of the invention, the respective solutions were atomized for 10 to 20 seconds on plates of heat-resistant borosilicate glass heated initially at about 700° C. The electrical resistance of the resulting iridized film was measured and other characteristics were noted as set forth in the examples.

Example 1

The solution consisted of 100 g. $SnCl_4 \cdot 5H_2O$, .0625 g. $SbCl_3$, 50 cc. $H_2O$ and 10 cc. HCl, equivalent to 99.91% $SnO_2$ and .09% $Sb_2O_3$. The fifth order film was colorless by transmitted light and had an electrical resistance of 24 ohms per square and a positive temperature coefficient of resistance.

Example 2

The solution consisted of 100 g. $SnCl_4 \cdot 5H_2O$, 1 g. $SbCl_3$, 50 cc. $H_2O$ and 10 cc. HCl, equivalent to 98.5% $SnO_2$ and 1.5% $Sb_2O_3$. The third order film was colorless by transmitted light and had a "standard resistance" of 17 ohms and a positive temperature coefficient of resistance.

Example 3

The solution consisted of 100 g. $SnCl_4 \cdot 5H_2O$, 4 g. $SbCl_3$, 3 g. $CuCl_2 \cdot 2H_2O$, 2 g. $FeCl_3 \cdot 6H_2O$, 50 cc. $H_2O$ and 10 cc. HCl, equivalent to 90.5% $SnO_2$, 5.4% $Sb_2O_3$, 2.9% CuO and 1.2% $Fe_2O_3$. The third order film was colorless by transmitted light and had a "standard resistance" of 40 ohms and a positive temperature coefficient of resistance.

Example 4

The solution consisted of 100 g. $SnCl_4 \cdot 5H_2O$, 8 g. $SbCl_3$, 50 cc. $H_2O$ and 10 cc. HCl, equivalent to 89.4% $SnO_2$, and 10.6% $Sb_2O_3$. The third order film was dark blue by transmitted light and had a "standard resistance" of 130 ohms.

Example 5

The solution consisted of 92 g. $SnCl_4 \cdot 5H_2O$, 8 g. $SbCl_3$, 50 cc. $H_2O$ and 10 cc. HCl, equivalent to 88.6% $SnO_2$, and 11.4% $Sb_2O_3$. Analysis of the film showed that it contained 87.4% $SnO_2$ and 12.6% $Sb_2O_3$. Its color was dense blue by transmitted light and the "standard resistance" was 330 ohms.

Example 6

The solution consisted of 84 g. $SnCl_4 \cdot 5H_2O$, 16 g. $SbCl_3$, 50 cc. $H_2O$ and 30 cc. HCl, equivalent to 77.9% $SnO_2$, and 22.1% $Sb_2O_3$. Analysis of the film showed that it contained 82.4% $SnO_2$ and 17.6% $Sb_2O_3$. Its color was dense blue by transmitted light and the "standard resistance" was 8,600 ohms.

Example 7

The solution consisted of 67 g. $SnCl_4 \cdot 5H_2O$, 33 g. $SbCl_3$, 50 cc. $H_2O$ and 30 cc. HCl, equivalent to 57.7% $SnO_2$ and 42.3% $Sb_2O_3$. Analysis of the film showed that it contained 77.9% $SnO_2$ and 22.1% $Sb_2O_3$. Its color was dense blue by transmitted light and the "standard resistance" was 104,000 ohms.

Example 8

The solution consisted of 10 g. $SnCl_4 \cdot 5H_2O$, 90 g. $SbCl_3$, 50 cc. $H_2O$ and 30 cc. HCl, equivalent to 7.0% $SnO_2$ and 93.0% $Sb_2O_3$. Analysis of the film showed that it contained 61.6% $SnO_2$ and 38.4% $Sb_2O_3$. The "standard resistance" of the film was 400,000 ohms.

Example 9

The solution consisted of 100 g. $SnCl_4 \cdot 5H_2O$, 1 g. $SbCl_3$, 8 g. $MnCl_2 \cdot 4H_2O$, 50 cc. $H_2O$ and 10 cc. HCl, equivalent to 91.3% $SnO_2$, 1.3% $Sb_2O_3$ and 7.4% $MnO_2$. The fourth order film was colorless by transmitted light and had an electrical resistance of 32 ohms per square and a positive temperature coefficient of resistance.

Example 10

The solution consisted of 100 g. $SnCl_4 \cdot 5H_2O$, 4 g. $SbCl_3$, 16 g. $MnCl_4 \cdot 4H_2O$, 50 cc. $H_2O$ and 10 cc. HCl, equivalent to 81.8% $SnO_2$, 4.9% $Sb_2O_3$ and 13.3% $MnO_2$. The third order film was substantially colorless by transmitted light and had a "standard resistance" of 36 ohms and a positive temperature coefficient of resistance.

Example 11

The solution consisted of 100 g. $SnCl_4 \cdot 5H_2O$, 1.5 g. $SbCl_3$, 1 g. $V_2O_5$, 50 cc. $H_2O$ and 10 cc. HCl, equivalent to 95.7% $SnO_2$, 2.1% $Sb_2O_3$ and 2.2% $V_2O_5$. The fourth order film was colorless by transmitted light and had an electrical resistance of 42 ohms per square.

Example 12

The solution consisted of 100 g. $SnCl_4 \cdot 5H_2O$, .5 g. $SbCl_3$, .5 g. $BiCl_3$, 50 cc. $H_2O$ and 10 cc. HCl, equivalent to 98.4% $SnO_2$, .7% $Sb_2O_3$ and .9% $Bi_2O_3$. The fourth order film had a faint brown tint and an electrical resistance of 50 ohms per square and had a positive temperature coefficient of resistance.

Example 13

The solution consisted of 100 g. $SnCl_4 \cdot 5H_2O$, 4 g. $SbCl_3$, 4 g. $BiCl_3$, 50 cc. $H_2O$ and 10 cc. HCl, equivalent to 88.6% $SnO_2$, 5.3% $Sb_2O_3$ and 6.1% $Bi_2O_3$. The fourth order film had a slight brown tint and an electrical resistance of 36 ohms per square and had a positive temperature coefficient of resistance.

Example 14

The solution consisted of 100 g. $SnCl_4 \cdot 5H_2O$, 4 g. $SbCl_3$, 6 g. $BiCl_3$, 50 cc. $H_2O$ and 10 cc. HCl, equivalent to 86% $SnO_2$, 5.1% $Sb_2O_3$ and 8.9% $Bi_2O_3$. The fourth order film had a brownish tint and an electrical resistance of 75 ohms per square.

Example 15

The solution consisted of 100 g. $SnCl_4 \cdot 5H_2O$, 2 g. $SbCl_3$, 8 g. $CoCl_2 \cdot 6H_2O$, 50 cc. $H_2O$ and 10 cc. HCl, equivalent to 91.4% $SnO_2$, 2.7% $Sb_2O_3$ and 5.9% $Co_2O_3$. The fourth order film was colorless by transmitted light and had an electrical resistance of 32 ohms per square and a positive temperature coefficient of resistance.

Example 16

The solution consisted of 100 g. $SnCl_4 \cdot 5H_2O$, 4 g. $SbCl_3$, 6 g. $BiCl_3$, 50 cc. $H_2O$ and 10 cc. HCl, equivalent to 93.2% $SnO_2$, 5.5% $Sb_2O_3$ and 1.3% ZnO. The fourth order film was blue by transmitted light and had an electrical resistance of 31 ohms per square and a positive temperature coefficient of resistance.

A fourth order film of the same composition was applied to a 2-inch square plate of high silica glass having a thermal expansion coefficient of about $8 \times 10^{-7}$ cm. per cm. per degree C. The film had an electrical resistance of 42 ohms per square. When an alternating current equivalent to 300 watts at 110 volts was passed through the film for a few minutes its temperature, as measured by an optical pyrometer, rose to 825° C. and its electrical resistance increased to 56 ohms per square. On cutting off the current and cooling to room temperature, its resistance reverted to about 42 ohms per square. Seven cycles of heating by passage of current followed by cooling to room temperature caused no substantial change in the resistance and other properties.

Example 17

The solution consisted of 100 g. $SnCl_4 \cdot 5H_2O$, 1 g. $SbCl_3$, 1 g. $FeCl_3 \cdot 6H_2O$, 50 cc. $H_2O$ and 10 cc. HCl, equivalent to 98% $SnO_2$, 1.4% $Sb_2O_3$ and .6% $Fe_2O_3$. The fifth order film was colorless by transmitted light and had an electrical resistance of 28 ohms per square and a zero temperature coefficient of resistance.

Example 18

The solution consisted of 100 g. $SnCl_4 \cdot 5H_2O$, 2 g. $SbCl_3$, 4 g. $CoCl_2 \cdot 6H_2O$, 50 cc. $H_2O$ and 10 cc. HCl, equivalent to 94.1% $SnO_2$, 2.8% $Sb_2O_3$ and 3.1% $Co_2O_3$. The fourth order film was colorless and had an electrical resistance of 24 ohms per square and a positive temperature coefficient of resistance.

Example 19

The solution consisted of 100 g. $SnCl_4 \cdot 5H_2O$, 1 g. $SbCl_3$, 8 g. $NiCl_2 \cdot 6H_2O$, 50 cc. $H_2O$ and 10 cc. HCl, equivalent to 92.5% $SnO_2$, 1.4% $Sb_2O_3$ and 6% $Ni_2O_3$. The fourth order film was colorless and had an electrical resistance of 45 ohms per square.

Example 20

The solution consisted of 100 g. $SnCl_4 \cdot 5H_2O$, 1 g. $SbCl_3$, 1 g. $ThCl_4$, 50 cc. $H_2O$ and 10 cc. HCl, equivalent to 97% $SnO_2$, 1.4% $Sb_2O_3$ and 1.6% $ThO_2$. The third order film was colorless and had a "standard resistance" of 18 ohms and a positive temperature coefficient of resistance.

Example 21

The solution consisted of 100 g. $SnCl_4 \cdot 5H_2O$, 1 g. $SbCl_3$, .5 g. $CuCl_2$, 50 cc. $H_2O$ and 10 cc. HCl, equivalent to 97.9% $SnO_2$, 1.4% $Sb_2O_3$ and .7% CuO. The fourth order film was colorless and had an electrical resistance of 25 ohms per square and a positive temperature coefficient of resistance.

Example 22

The solution consisted of 100 g. $SnCl_4 \cdot 5H_2O$, 1 g. $SbCl_3$, 4 g. $CrCl_3$, 50 cc. $H_2O$ and 10 cc. HCl, equivalent to 94.4% $SnO_2$, 1.4% $Sb_2O_3$ and 4.2% $Cr_2O_3$. The fourth order film was colorless and had an electrical resistance of 18 ohms per square and a positive temperature coefficient of resistance.

Example 23

A series of solutions composed of various proportions of indium chloride and stannic chloride dissolved in aqueous hydrochloric acid was atomized for 10 to 20 seconds on plates of heat-resisting borosilicate glass heated at 700° C. The resistances of the fourth order films corresponding to the respective solutions expressed in terms of the calculated contents of indium oxide and stannic oxide in the solutions were as follows:

| Per Cent $In_2O_3$ | Per Cent $SnO_2$ | Ohms per square |
|---|---|---|
| 99.1 | 0.9 | 10 |
| 98.2 | 1.8 | 10 |
| 96.3 | 3.7 | 12 |
| 92.6 | 7.4 | 16 |
| 85.1 | 14.9 | 51 |
| 76.6 | 23.4 | 65 |
| 52 | 48 | 286 |

Example 24

The solution consisted of 5.08 g. $InCl_3$, 0.28 g. $SnCl_4 \cdot 5H_2O$, 0.21 g. $CdCl_2 \cdot 2H_2O$, 8 cc. $H_2O$ and 2 cc. HCl, equivalent to 93% $In_2O_3$, 3.5% $SnO_2$ and 3.5% CdO. The third order film was transparent and had a "standard resistance" of 55 ohms.

Example 25

The solution consisted of 5.08 g. $InCl_3$, 0.28 g. $SnCl_4 \cdot 5H_2O$, 0.11 g. $CdCl_2 \cdot 2H_2O$, 8 cc. $H_2O$ and 2 cc. HCl, equivalent to 94.6% $In_2O_3$, 3.6% $SnO_2$ and 1.8% CdO. The third order film was transparent and had a "standard resistance" of 30 ohms.

Example 26

The solution consisted of 5.08 g. $InCl_3$, 0.28 g. $SnCl_4 \cdot 5H_2O$, 0.11 g. $CuCl_2 \cdot 2H_2O$, 8 cc. $H_2O$ and 2 cc. HCl, equivalent to 95% $In_2O_3$, 3.6% $SnO_2$ and 1.4% CuO. The third order film was transparent and had a "standard resistance" of 133 ohms.

Example 27

The solution consisted of 4.87 g. $InCl_3$, 0.56 g. $SnCl_4 \cdot 5H_2O$, 0.11 g. $CuCl_2 \cdot 2H_2O$, 8 cc. $H_2O$ and 2 cc. HCl, equivalent to 91.3% $In_2O_3$, 7.3% $SnO_2$ and 1.4% CuO. The third order film was transparent and had a "standard resistance" of 85 ohms.

Example 28

The solution consisted of 4.45 g. $InCl_3$, 1.12 g. $SnCl_4 \cdot 5H_2O$, 0.11 g. $CuCl_2 \cdot 2H_2O$, 8 cc. $H_2O$, and 2 cc. HCl, equivalent to 83.4% $In_2O_3$, 15.2% $SnO_2$ and 1.4% CuO. The third order film was transparent and had a "standard resistance" of 170 ohms.

Example 29

The solution consisted of 5.08 g. $InCl_3$, 0.28 g. $SnCl_4 \cdot 5H_2O$, 0.85 g. $FeCl_3 \cdot 6H_2O$, 8 cc. $H_2O$ and 2 cc. HCl, equivalent to 89.5% $In_2O_3$, 3.4% $SnO_2$ and 7.1% $Fe_2O_3$. The third order film was transparent and had a "standard resistance" of 47 ohms.

Example 30

The solution consisted of 5.08 g. $InCl_3$, 0.28 g. $SnCl_4 \cdot 5H_2O$, 0.053 g. $CrO_3$, 8 cc. $H_2O$ and 2 cc. HCl, equivalent to 95.1% $In_2O_3$, 3.7% $SnO_2$ and 1.2% $Cr_2O_3$. The third order film was transparent and had a "standard resistance" of 96 ohms.

Example 31

The solution consisted of 10 g. $Cd(NO_3)_2 \cdot 4H_2O$, 0.1 g. $InCl_3$, and 10 cc. $H_2O$, equivalent to 98.6% CdO and 1.4% $In_2O_3$. The first order film was transparent and had an electrical resistance of 650 ohms per square, equivalent to 93 ohms per square for a fourth order film.

Example 32

The solution consisted of 10 g. $Cd(NO_3)_2 \cdot 4H_2O$, 0.2 g. $InCl_3$ and 10 cc. $H_2O$, equivalent to 97.1% CdO and 2.9% $In_2O_3$. The first order film was transparent and had an electrical resistance of 160 ohms per square, equivalent to 23 ohms per square for a fourth order film.

Example 33

The solution consisted of 10 g. $Cd(NO_3)_2 \cdot 4H_2O$, 0.4 g. $InCl_3$, and 10 cc. $H_2O$, equivalent to 94.6% CdO and 5.4% $In_2O_3$. The first order film was transparent and had an electrical resistance of 42 ohms per square, equivalent to 6 ohms per square for a fourth order film.

Example 34

The solution consisted of 10 g. $Cd(NO_3)_2 \cdot 4H_2O$, 0.8 g. $InCl_3$ and 10 cc. $H_2O$, equivalent to 89.3% CdO and 10.7% $In_2O_3$. The first order film was transparent and had an electrical resistance of 35 ohms per square, which is equivalent to 5 ohms per square for a film of the fourth order.

Tin-antimony films made in accordance with this invention have good chemical stability and their electrical properties undergo little, if any, change under adverse conditions. This is demonstrated in the following examples:

Example 35

A sheet of borosilicate glass having a thermal expansion coefficient of $33 \times 10^{-7}$ cm. per cm. per degree C. was provided with platinized stripes along two opposite edges so that the surface area between the stripes was 3 inches square. The plate was then iridized with the solution shown in Example 16 until an iridized film of the third order was formed on and between the platinized stripes. The initial "standard resistance" of the iridized film was 39 ohms. The film was heated for 100 hours at a temperature of 350° C. by passing through it an alternating electric current equivalent to 10.8 watts per square inch of film at an applied voltage which was varied between 61 and 63 volts in order to maintain constant wattage. At the end of this time the resistance was 38 ohms.

Example 36

An iridized glass plate similar in all respects to that described in Example 35 was tempered in known manner after iridizing, by heating it to a temperature between its strain and annealing points and thereafter quenching it with a stream of cold air. The plate was then heated for 494 hours at a temperature of 400° C. by passing an alternating current equivalent to 14.2 watts per square inch through the film at an applied voltage of 63 to 66 volts. The initial "standard resistance" of the film at 400° C. was 34.2 ohms. After 110 hours the "standard resistance" was 31.4 ohms, and at the end of 494 hours the "standard resistance" was 32.6 ohms. The slight decrease in resistance was caused by the stabilization of stresses induced in the film by tempering. Once stabilized, the resistance remains substantially constant.

Example 37

A tempered iridized glass plate similar in all respects to that described in Example 36 was heated at 350° C. by passing an alternating current equivalent to 10.8 watts per square inch through the film. After the "standard resistance" has become stabilized at 36.7 ohms, the film was heated for 2 hours at 350° C., then cooled and exposed for 30 minutes to live steam after which it was again heated for 2 hours at 350° C., as before. Alternate heating and steaming were continued for 21 cycles, after which the "standard resistance" was found to be 38 ohms.

Example 38

A tempered iridized glass plate similar in all respects to that described in Example 36 was heated at 350° C. by passing an alternating current equivalent to 10.8 watts per square inch through the film. After the "standard resistance" had become stabilized at 33.9 ohms, the plate was cooled to room temperature and the iridized film was smeared with the cooking fat which is sold under the trade-name "Crisco." The film was then heated as before for about 30 minutes during which time the fat was burned off leaving a slight carbonaceous residue. The plate was again cooled and the film was again smeared with the fat, after which it was again heated for about 30 minutes to burn off the fat. After 42 cycles of alternate greasing and burning off, the "standard resistance" measured 33.9 ohms.

*Example 39*

A tempered iridized glass plate similar in all respects to that described in Example 36 was treated by alternately greasing it and burning off the grease as in Example 38 with the exception that after each burning-off the carbonaceous residue was removed from the iridized film by scouring with the cleaner sold under the trade-mark "Bon Ami" before the film was re-greased. The temperature of heating was 350° C. The stabilized initial "standard resistance" at 350° C. was 32.2 ohms. After 47 cycles of alternate greasing, burning off, and scouring, the resistance measured 32.2 ohms.

From the foregoing examples it will be seen that iridized glass or ceramic bodies coated with the oxide films of this invention are particularly suitable for use as the heating elements or units of electric heating devices, as for example, devices for culinary purposes, such as hot plates, electric range units, warming tables, baking ovens, grills, toasters, coffee makers, waffle irons, griddles, etc.; household utensils such as flat irons, serving trays, clothes driers, hair driers, therapeutic heaters, etc.; anti-frosting devices such as electrically-heated window panes, vehicle windows, windshields, etc.; space-heating devices such as portable space heaters, wall panels, self-heating glass building blocks, combination lighting and heating units, chicken brooders, etc.; low-temperature ovens such as paint driers.

It is a peculiar characteristic of the new low resistance iridized films that when deposited on transparent glass sheets and heated by the passage of electric current, they emit more radiant heat from the back, that is, through the glass, than from the outer face of the film. This enhances their utility, particularly in cases where it might be desirable to bring the heating unit into contact with food to be cooked, as in devices for making griddle cakes, waffles, etc.

To illustrate electric heating devices made in accordance with this invention reference is had to Fig. 3 in which two glass plates 20 are provided on opposite edges with platinized stripes 21 and 22 (shown on an exaggerated scale), and tin-antimony iridized films 23 (also greatly exaggerated) therebetween. The plates 20 are supported in spaced parallel relation on a dielectric base 24 by metal strips 25 which are attached to the platinized stripes 22. The metal strips 25 are secured to the base 24 by binding posts 26, to which a wire 27 forming one side of an electric circuit is connected. The other side of the circuit is electrically connected with the platinized stripes 21. From this it will be seen that the iridized films 23 are electrically connected in parallel. Between the glass plates 20 is located a slice of bread 28 to be toasted and the entire assembly is surrounded by a protecting shell 29.

Other arrangements of the various parts of the device shown in Fig. 3 and modifications thereof for other purposes will be apparent to those skilled in the art and are included within the scope of the invention as claimed.

The new iridized films may also be used for purposes other than for electric heating devices, as for example, to form the conducting laminations in capacitors or to provide high resistance coatings for making standard resistances, potentiometers, rheostats, grid leaks, etc. Films which are colored, such as those containing substantial amounts of antimony, may be employed as light filters, as for example, on window panes, glass building blocks, etc. Such windows or wall units can thus have a pleasing color and a selective transmission for visible light and at the same time can be made self-defrosting or heat-emitting by passage of suitable electric current through the film.

I claim:

A vitreous ceramic body having on a surface thereof a transparent, metal oxide film integrally united with such surface and consisting essentially of stannic oxide and from about 8% to about 38% $Sb_2O_3$, said film being deep bluish in color by transmitted light.

JOHN M. MOCHEL.

REFERENCES CITED

The following references are of record in the file of this patent:

UNITED STATES PATENTS

| Number | Name | Date |
|---|---|---|
| 1,954,832 | Ruben | Apr. 17, 1934 |
| 2,118,795 | Littleton | May 24, 1938 |
| 2,119,680 | Long | June 7, 1938 |
| 2,194,189 | Wheeler et al. | Mar. 19, 1940 |
| 2,244,777 | Hood | June 10, 1941 |
| 2,274,955 | Dykstra et al. | Mar. 3, 1942 |
| 2,429,420 | McMaster | Oct. 21, 1947 |
| 2,467,144 | Mochel | Apr. 12, 1949 |

FOREIGN PATENTS

| Number | Country | Date |
|---|---|---|
| 577,748 | Great Britain | May 30, 1946 |

Certificate of Correction

Patent No. 2,564,707 August 21, 1951

JOHN M. MOCHEL

It is hereby certified that error appears in the printed specification of the above numbered patent requiring correction as follows:

Column 2, line 51, for "resistances" read *resistance*; column 4, line 72, for "At atomizer" read *An atomizer*; column 5, line 71, for "thicknesses" read *thickness*; line 72, for "thickness" read *thicknesses*; column 9, line 57, for "6 g. BiCl$_3$," read *1 g. ZnCl$_2$*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*